United States Patent [19]
Carrubba et al.

[11] Patent Number: 5,629,866
[45] Date of Patent: May 13, 1997

[54] AUDIO-VISUAL PRESENTATION SYSTEM

[75] Inventors: Francis P. Carrubba; Peter J. L. A. Swillens, both of Eindhoven, Netherlands

[73] Assignee: U.S. Philips Corporation, New York, N.Y.

[21] Appl. No.: 407,537

[22] Filed: Mar. 20, 1995

[30] Foreign Application Priority Data

Mar. 18, 1994 [EP] European Pat. Off. .............. 94200714

[51] Int. Cl.$^6$ ...................................................... H04N 9/79
[52] U.S. Cl. ........................................ 364/514 A; 348/563
[58] Field of Search ....................... 364/514 A; 348/563, 348/568, 584, 586; 345/113, 202, 214

[56] References Cited

U.S. PATENT DOCUMENTS

| | | | |
|---|---|---|---|
| 4,317,114 | 2/1982 | Walker | 345/113 |
| 5,140,416 | 8/1992 | Tinkler | 348/33 |
| 5,218,455 | 6/1993 | Kristy | 358/403 |
| 5,229,855 | 7/1993 | Slann | 348/588 |
| 5,253,058 | 10/1993 | Gharavi | 358/136 |
| 5,287,178 | 2/1994 | Acampora et al. | 348/384 |

FOREIGN PATENT DOCUMENTS 2596605  10/1987  France .

OTHER PUBLICATIONS

"Compact Disc Interactive A Designer's Overview" Chapter 7, Published by Kluwer, Dec. 1991.

ISO/IEC 13818-2, ITU-T Draft Rec. H. 262 (Nov. 25, 1993).

ISO-IEC/JTC1/SC29/WG11 Coded Representation of Picture and Audio Information Test Model 5, Draft, Apr. 1993.

Section 2 Paragraph I.4 (Fig. 2-I.4) ISO/IEC 11172.

*Primary Examiner*—Emanuel T. Voeltz
*Assistant Examiner*—Thomas Peeso
*Attorney, Agent, or Firm*—Laurie E. Gathman

[57] ABSTRACT

The invention relates to a system for giving an audio-visual presentation consisting of a basic part and at least a complementary part, such as a video film. The system comprises different storage media for storing the basic part and the complementary pan and merging means for merging the basic part with the complementary part into the audio-visual presentation. The complementary part is intended for enhancing the audio-visual presentation quality that can be achieved with the basic part. A provider may provide a basic part free of charge on a CD-i disc, after which the user is to pay for the complementary pan which may be transmitted to him via a telephone line from a databank.

10 Claims, 5 Drawing Sheets

AUDIO-VISUAL PRESENTATION SYSTEM

BACKGROUND OF THE INVENTION

The invention relates to a system for providing an audio-visual presentation comprising a basic pan and at least a complementary pan, the, system comprising functionally distinguishable storage media for storing the basic part and the complementary part, and merging means for merging the basic part with the complementary part into the audio-visual presentation.

Such a system is known from French Patent Application 2 596 605. In that document the system comprises a video system intended for the transmission of commercials in chain stores having various branches. A first storage medium. which is a video tape, is found close to the merging means in a branch of the chain store. Another storage medium is found at a different location and is linked to the merging means via a telephone line. The audio-visual presentation generated by the merging means is transferred to be displayed on a video screen which is located at a conspicuous spot in the shop. On the video tape there is the basic part which does not often change. The basic part contains, for example, video pictures of products on sale in the chain store. The further storage medium stores a complementary part intended for temporary use. This complementary part contains, for example, text about offerings. The basic part is to be merged with the complementary part in a certain manner. The storage medium on which the complementary part is stored is found at a central location from which all the branches of the chain store can be supplied with information. This storage medium contains not only the complementary part, but also commands in response to which the basic part and the complementary part are to be merged. The complementary part and the commands are transmitted to the merging means at the time when the shop is closed, for example, at the end of the shopping day. At a later instant, for example, before the shop is opened in the morning, the basic part and the complementary part are merged in response to the commands, after which the audio-visual presentation is held. The video system described in that document is rather rigid and is merely arranged for changing frequently varying data in the audio-visual presentation such as commercials. The change will then not be effected until the complete complementary part has been received.

SUMMARY OF THE INVENTION

It is an object of the invention to provide a system as defined in the: opening paragraph which is considerably more flexible and offers many more possibilities to a user.

For this purpose, a system as defined in the opening paragraph is characterized in that the complementary part is intended for enhancing the quality of the audio-visual presentation that can be achieved with the basic part. In this manner the user has the possibility of enhancing the quality of the audio-visual presentation, such as a video film. The user is first offered by a service provider a basic part of the audio-visual presentation with a low quality, such as a presentation with a low picture resolution, free of charge or at a reduced rate and may then decide whether he wishes to have the complementary part and thus a more complete version of the audio-visual presentation by paying a considerably higher rate.

An embodiment for a system according to the invention is characterized in that the storage medium containing the basic part is located near the merging means and in that the other storage medium containing the complementary part is linked to the merging means via a transmission line of a communications network. The communications network is, for example, the public telephone network. The storage medium containing the complementary part is located, for example, in a data bank controlled by the provider. The complementary part stored in the databank is accessible to a plurality of users of a system according to the invention via the telephone network.

A further embodiment for a system according to the invention is characterized in that the merging means are arranged for real-time merging the basic part with the complementary part. As a result, the audio-visual presentation may be given immediately after the user has so requested.

A further embodiment for a system according to the invention is characterized in-that the audio-visual presentation is divided into a basic part and a complementary part by an MPEG2 encoder and in that the merging means comprise an MPEG2 decoder for merging the basic part with the complementary part into the audio-visual presentation. MPEG2 is a proposal for a video encoding standard. MPEG2 has provisions for so-called spatial scalability. In spatial scalability, two so-called video layers are permitted. A lower layer and an enhancement layer. The lower layer is represented by the basic part. The enhancement layer is represented by the complementary part. The basic part results in an audio-visual presentation with a basic level picture resolution. The basic part and the complementary part together result in a high picture resolution.

A further embodiment for a system according to the invention is characterized in that the system further comprises control means for causing the reading means to read the basic part and the complementary part in response to pre-fed information about locations on the storage media where the basic part and the complementary part are found. As a result, both the basic part and the complementary part are rapidly found and read.

A further embodiment for a system according to the invention is characterized in that the storage media are subdivided into sectors containing data that belong to the basic part and the complementary part, and in that the location information contains numbers of the sectors. As a result of the subdivision into sectors, the reading means need to receive only sector numbers of the sectors in which data belonging to the basic part and the complementary part are located. The reading means then sequentially read the data in the sectors.

A further embodiment for a system according to the invention is characterized in that the system comprises synchronizing means for mutually synchronizing data streams to be fed to the merging means, which data streams contain data belonging to the basic part and the complementary part. The synchronizing means are necessary, because the delay of the data streams from the storage medium where the basic part is found or from the storage medium where the complementary part is found to the merging means may be different. By mutually synchronizing the data streams, the data belonging to the basic part and those belonging to the complementary part are fed to the merging means at the right moment.

A further embodiment for a system according to the invention is characterized in that the synchronizing means comprise buffers according to the First-In First-Out principle for receiving the data streams and in that the synchronizing means are arranged for monitoring the packing factor of the buffers and issuing, in response, control information to the control means, which control means are arranged for providing data flow control by means of the control information. The reading means are arranged for reading data from the storage media at a particular rate. In dependence on the packing factor of the buffers, the control means send commands to the reading means to read data or just stop reading data.

BRIEF DESCRIPTION OF THE INVENTION

The invention will be further described with reference to a drawing in which.

DETAILED DESCRIPTION OF THE PREFERRED EMBODIMENTS

Figure 1:
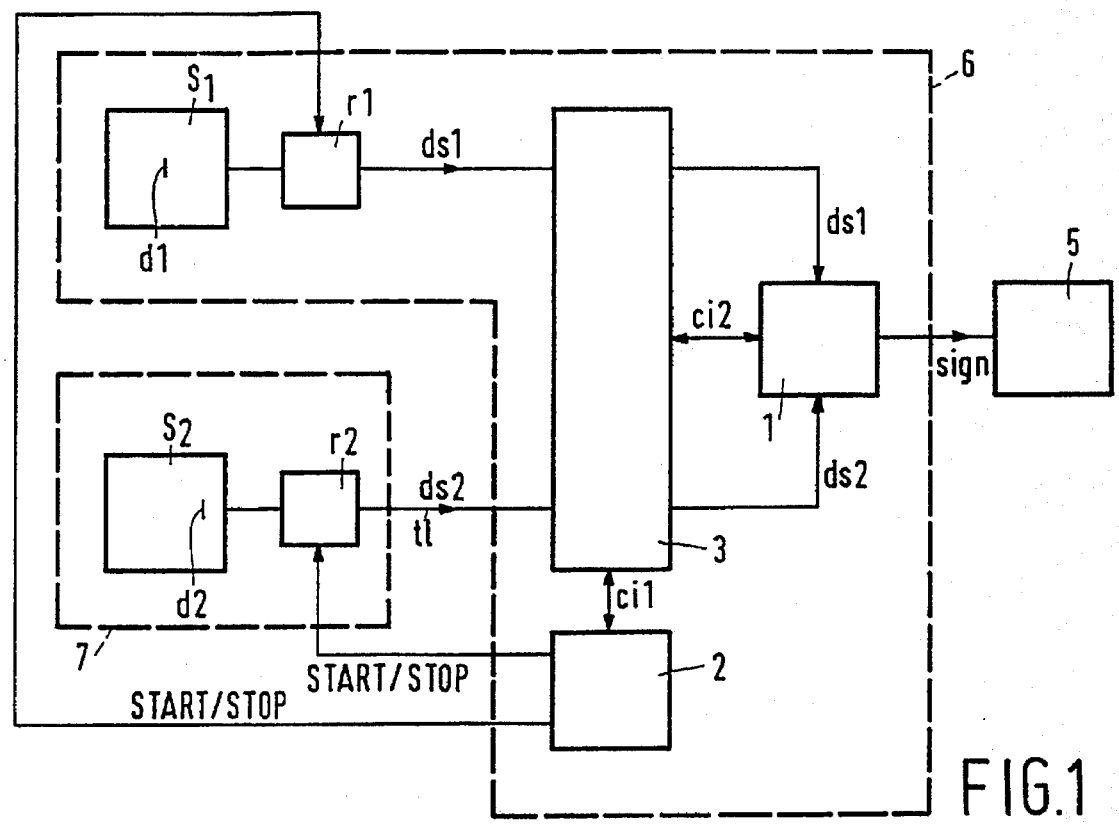
FIG. 1 shows a system according to the invention.

FIG. 1 shows a system according to the invention. Such a system is, for example, a CD-i system which is capable of processing multi-media data into audio and video. However, the invention is not restricted thereto. The system comprises a first storage medium S1 containing the basic part d1 and a second storage medium S2 containing the complementary part d2. The complementary part is used for enhancing the audio-visual presentation quality that can be achieved with the basic part. This audio-visual presentation is, for example, a video film. The basic part and the complementary past have a known correlation. Under the control of control means 2 the basic part and the complementary part are read out by first and second reading means r1, r2 at a certain rate. This results in a first data stream ds1 which contains data belonging to the basic part, and a second data stream ds2 which contains data belonging to the complementary part. The data stream ds1, ds2 are fed to synchronizing means 3 which cancel, as required, any delay differences between the two data streams. The synchronizing means and the control means together provide the data flow control. The synchronizing means monitor the first and second data streams and send control information ci1 to the control means 2. In response to this control information these control means 2 order by the START command the reading means to start reading data, which command contains location information about the location of the data recorded on the storage medium, or the STOP command to just stop reading certain data. The two data streams are then fed to the merging means 1. The synchronizing means and the merging means exchange control information ci2. This information indicates, for example, what data belonging to the basic part and the complementary part are to be fed to the merging means at a specific instant. The merging means merge the basic part with the complementary part into a signal 'sign'. This signal is a video signal which is subsequently fed for display to a television set 5.

The system is subdivided into a number of components: A device 6, which is a CD-i player, in which the data streams are merged into a signal that represents the audio-visual presentation. This signal is displayed on a television set 5. Furthermore, the system comprises a databank in which the second storage medium s2 is found. The databank 7 is found at a different location from the device 6 and is connected thereto by a telephone line t1.

Figure 2:
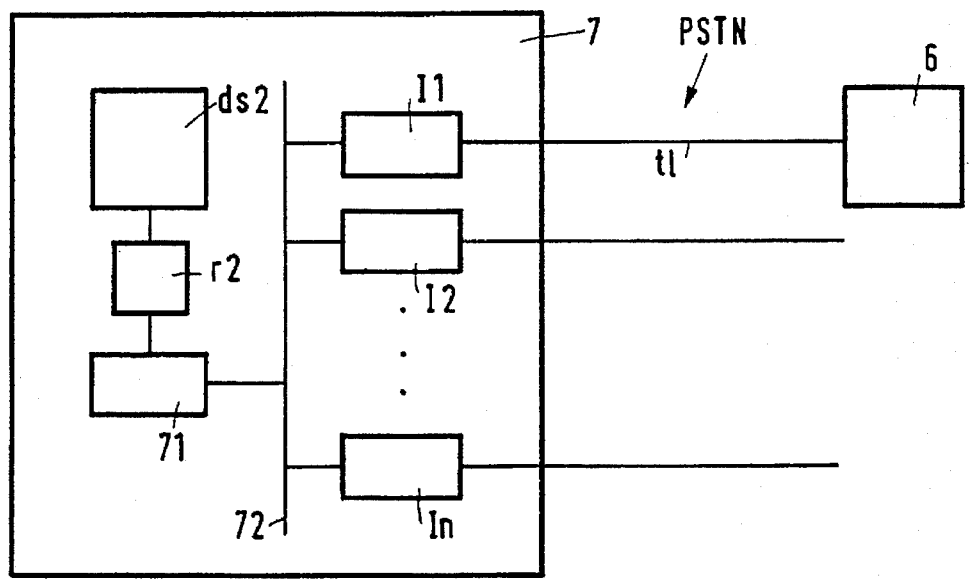
FIG. 2 shows a databank in which the complementary part is stored.

FIG. 2 shows a databank 7 in which the second storage medium ds2 is found. The second storage medium ds2 is coupled to CPU 71. The CPU 71 is coupled to a bus 72 to which, furthermore, a number of network interfaces I1 ... In are connected. A command coming from the system control means 2 results in the data belonging to the complementary part being read from a predetermined location on the storage medium under the control of the CPU. These data are then transmitted via the bus 72 of the interface I1 through the telephone line t1 in the public telephone newtwork PTSN to the CD-i player 6. The databank 7 contains further interfaces I2 ... In. These interfaces are meant for communication with other CD-i players. The databank is capable of simultaneously supplying different data to a plurality of CD-i players. The databank 7 may be arranged, for example, for video-on-demand service. With the video-on-demand service, video film data are supplied to CD-i players on request. The databank may be controlled by a provider who provides the basic part free of charge or at a small amount on CD-i disc to the users, and allows users to read the second part from the databank against payment of a higher amount.

Figure 3A:
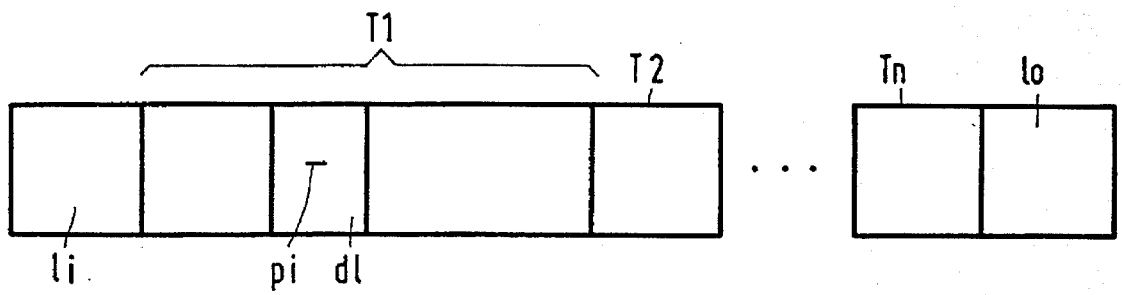
FIGS. 3a and 3b show the structure of a CD-i disc.

FIG. 3a shows the structure of the first storage medium. In the case where the system is a CD-i system, the first storage medium is a CD-i disc. This CD-i disc has a prescribed structure. It first has a m-called lead-in area li, followed by a number of tracks T1 ... Tn, which are followed in the end by a lead-out area lo. In the first track T1 there is a disc label dl at a fixed spot. The disc label contains location information pi in the form of a description of the files that are found on the disc and on the storage means in the databank 7. The data belonging to a file are subdivided into sectors which have fixed and mutually equal lengths. Each sector has a unique address.

Figure 3B:
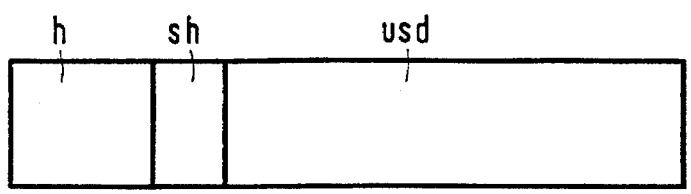

FIG. 3b shows the structure of a sector. The sector has a header h, a subheader sh, which both have a fixed length and are followed by a fixed number of user data usd. The header h contains, for example, information about the address of the sector. For more detailed information about CD-i players reference be made to chapter 7 of "Compact Disc Interactive A Designer's Overview" published by Kluwer, Deventer 1991.

Figure 4:
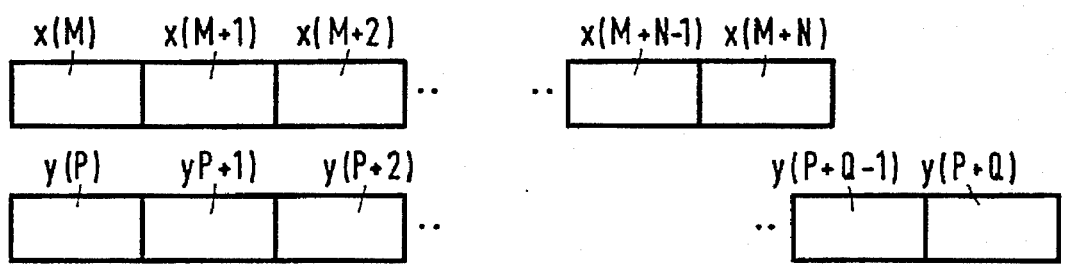
FIG. 4 shows sectors on a CD-i disc and in a databank in which sectors the basic part and the complementary part are found.

FIG. 4 shows sectors of the first and second storage media in which data belonging to the basic part and the complementary part are found. The data belonging to the basic part are found in the sectors x(M) ... x(M+N) on the first storage medium and the data belonging to the complementary part are found in the sectors y(P) . . . y(P +Q) on the second storage medium. If the user requests reproduction of the audio-visual information, the reading means start reading data from the first sectors x(M), y(P) on both the first and second storage media under the control of the control means 2. For this purpose, the control means read location information pi from the CD-i disc in advance. Then the next sectors x(M+1) . . . x(M+N), y(P+1) . . . y(P+Q)are read sequentially. Depending on the correlation between basic part and complementary part, the merging means merge the two data streams. It is not necessary that the number of sectors N in which the data belonging to the basic part are found are equal to the number of sectors Q in which the data belonging to the complementary part are found.

Figure 5:
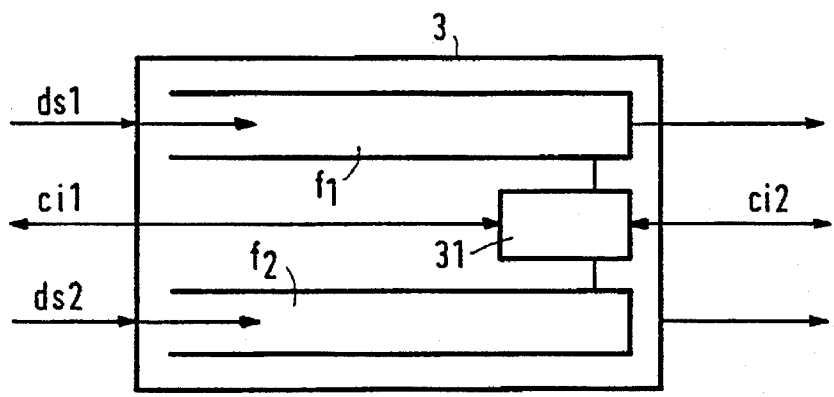
FIG. 5 shows synchronizing means.

FIG. 5 shows the synchronizing means 3. The synchronizing means comprise a first buffer f1 according to the First-In First-Out principle (FIFO), to which the first data stream ds1 is applied and a second buffer f2 according to the First-In First-Out principle (FIFO) to which the second data stream ds2 is applied. The synchronizing control means 31 monitor the packing factor of the two buffers. In response to information in the sector headers, the synchronizing control means can detect what data are in the buffers. On the basis of these data they send the control information ci1 to the control means which provide the data flow control with this information, as has been described earlier. If a buffer is nearly full, the reading of data is stopped. If a buffer is nearly empty, the reading of data is resumed.

Figure 6:
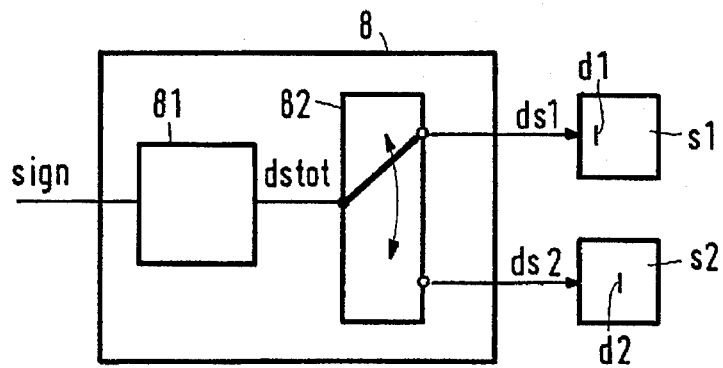
FIG. 6 shows a first manner of subdividing the audio-visual presentation into the basic part and the complementary part and the storage of these parts on a first and a second storage medium.

FIG. 6 shows a first manner of subdividing the data into the basic part and the complementary part and the storage of these parts on a first and a second storage medium. The subdividing means 8 comprise an MPEG1 video encoder 81 which converts an analog video signal into digital video data. This results in a data stream dstot which contains both the data belonging to the basic part and the data belonging to the complementary part. MPEG1 is a video coding standard (official name: ISO/IEC 11172), in which data compression is used. MPEG1 knows a so-called interframe coding. A frame is then fully coded once per time unit. This frame is called an Intra Coded Picture. In the period of time between the two Intra Coded Pictures there are Predictive Coded Pictures and Bidirectional Predictive Coded Pictures. Predictive Coded Pictures are coded with reference to a previous Predictive Coded Picture or a previous Intra Coded Picture. Bidirectional Predictive Coded Pictures are coded with reference to both a previous and a next Intra Coded or Predictive Coded Picture. The data stream dstot, which is a MPEG1 data stream, is applied to a switching element 82. The switching element 82 switches the data stream dstot between the first and second storage media at a certain rate. The data belonging to the Intra Coded Pictures are switched to the storage medium s1. These data form the basic part. The data belonging to the Predictive Coded Pictures and the Bidirectional Predictive Coded Pictures are switched to the second storage medium. These data form the complementary past. More information about this coding method is given in Section 2 paragraph I.2.1 (FIG. 2-I.1 ) of the ISO/IEC 11172 standard. A block diagram of an MPEG1 encoder is described in Section 2 paragraph I.3 (FIG. 2-I.2) of this standard.

Figure 7:
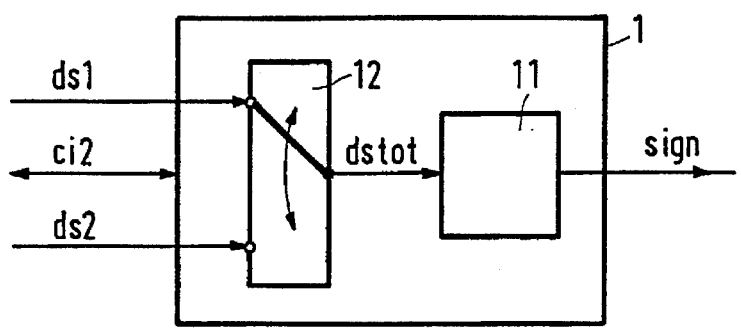
FIG. 7 shows merging means for merging the basic part with the complementary part which are subdivided in the first manner.

FIG. 7 shows merging means for merging the basic part with the complementary part which have been subdivided in the first manner. The data streams ds1 and ds2 containing the data, which belong to the basic part and the complementary part, are fed to the merging means 1. The switch 12 switches the first and second data streams through, so that in the data stream dstot the basic part which contains the Intra Coded Pictures and the complementary part which contains the Predictive Coded Pictures and the Bidirectional Predictive Coded Pictures occur in the right order. The data stream dstot is then applied to an MPEG1 decoder 11 which converts the data stream into a signal 'sign' for display. If the user does not wish to have the complementary part, only the basic part, which contains the Intra Coded Pictures, is fed to the decoder 11. In that case the user is supplied with a complete but "still" picture only a few times per second. If the user also uses the complementary part, the audio-visual presentation is given in full. A block diagram of an MPEG1 decoder is described in Section 2 paragraph 1.4 (FIG. 2-I.4) of the ISO/IEC 11172 standard.

Figure 8:
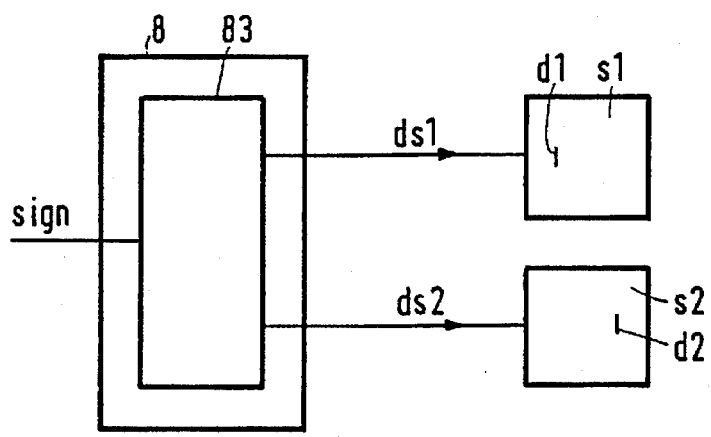
FIG. 8 shows a second manner of subdividing the audio-visual presentation into the basic part and the complementary part and the storage of these parts on a first and a second storage medium.

FIG. 8 shows a second manner of subdividing the data into the basic part and the complementary part and the storage of these parts on a first and a second storage medium. The subdividing means 8 comprise an MPEG2 encoder 83 arranged for encoding video signals. MPEG2 is a proposal for a video encoding standard in which data compression is used. MPEG2 is described in ISO/IEC 13818-2, ITU-T Draft Rec. H.262 (Nov. 25, 1993. MPEG2 knows facilities for so-called spatial sealability. In the case of spatial scalability two so-called video layers are permitted. A lower layer and an enhancement layer. The lower layer is represented by the data belonging to the basic part, which data form the first data stream generated by the MPEG2 encoder 83. The enhancement layer is represented by the data belonging to the complementary part, which data form the second data stream. Upon decoding, the data belonging to the basic part result in a basic level picture resolution. Upon decoding, the data belonging to the basic part and the complementary part together result in a high picture resolution. Spatial scalability in MPEG2 is described in paragraph I.4.2 of ITU-T Draft Rec. H.262. An MPEG2 encoder 83 is described in paragraph 2.2 (FIG. 2.2) of ISO-IEC/JTC1/SC29/WG11 Coded Representation of Picture and Audio Information, Test model 5, Draft, April 1993. The data streams ds1, ds2 are led to the storage media s1, s2, which results in the storage of the basic part d1 and the complementary part d2.

Figure 9:
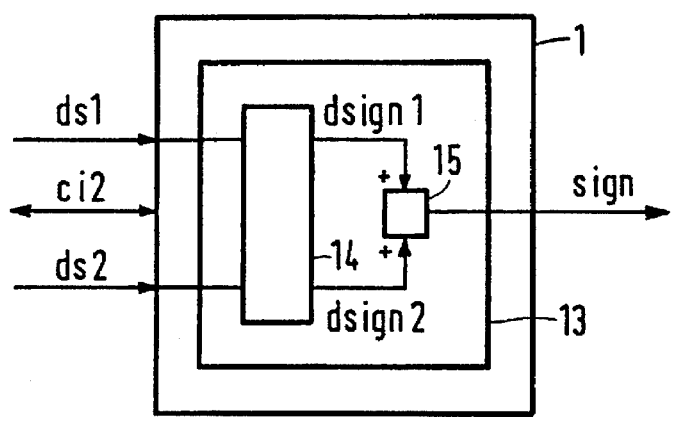
FIG. 9 shows merging means for merging the basic part with the complementary part which are subdivided in the second manner.

FIG. 9 shows merging means for merging the basic part with the complementary part which are subdivided in the second manner. The merging means comprise an MPEG2 decoder 13 for convening the first and second data streams into the signal 'sign' which represents the audio-visual presentation. The decoder 13 comprises signal processing means 14 for convening the first and second data streams ds1, ds2 into a first and a second sub-signal dsign1, dsign2. The first sub-signal is a lower layer video signal. The second sub-signal is an enhancement layer video signal. Furthermore, the MPEG2 decoder 13 comprises a summation circuit 15 for adding together the two sub-signals dsign1, dsign2. If only the first sub-signal dsign1 is present, the basic level picture resolution is achieved. The sum of the two sub-signals forms the signal 'sign' which results in a higher picture resolution. An MPEG2 decoder is described in paragraph 2.2 (FIG. 2.4) of ISO-IEC/JTC1/SC29/WG11 Coded Representation of Picture and Audio Information, Test model 5, Draft, April 1993. The user of a CD-i player may choose whether he wishes to watch the basic-resolution or high-resolution video. The basic part d1, which represents basic video quality, is stored on the CD-i disc. If the user of the CD-i disc does not wish to watch the high resolution video picture, no complementary part is read from the second storage medium. The user then obtains a basic resolution video picture.

Figure 10:
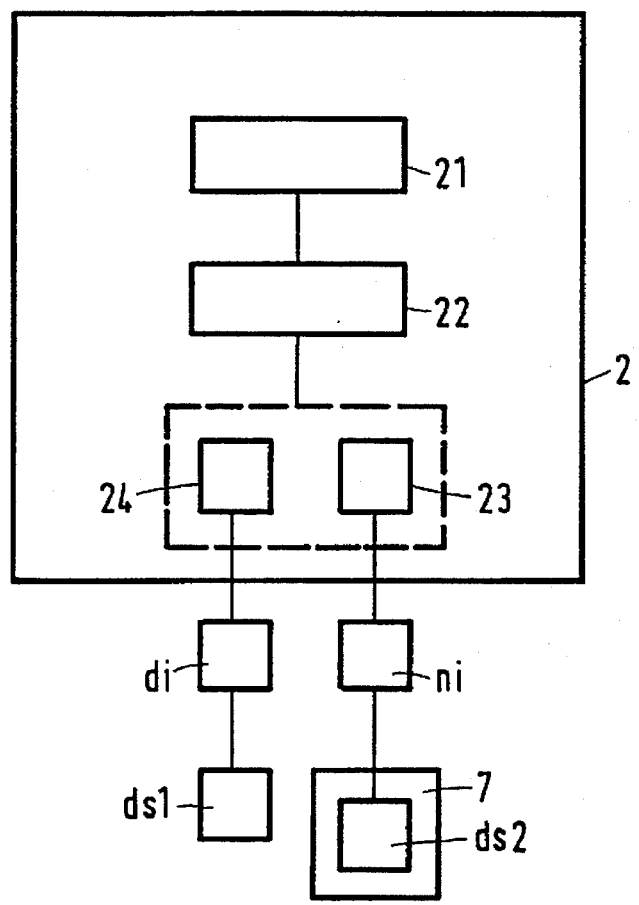
FIG. 10 shows the organization of the control means.

FIG. 10 shows the organization of the control means of a CD-i system according to the invention. The control means are designed as software. They have an application program 21, an operating system 22 and drivers 23, 24. The application program is a program belonging to a specific CD-i application. The operating system 22 provides control in general, such as storage management, synchronization etc. The drivers 23, 24 provide the communication with the first and second storage media. There is a hardware disc interface di and a network interface ni between the drivers 23, 24 and the storage media. Further information about the CD-i control is given in the already cited Chapter 7 of "Compact Disc Interactive A Designer's Overview" published by Kluwer, Deventer 1991.

Figure 11:
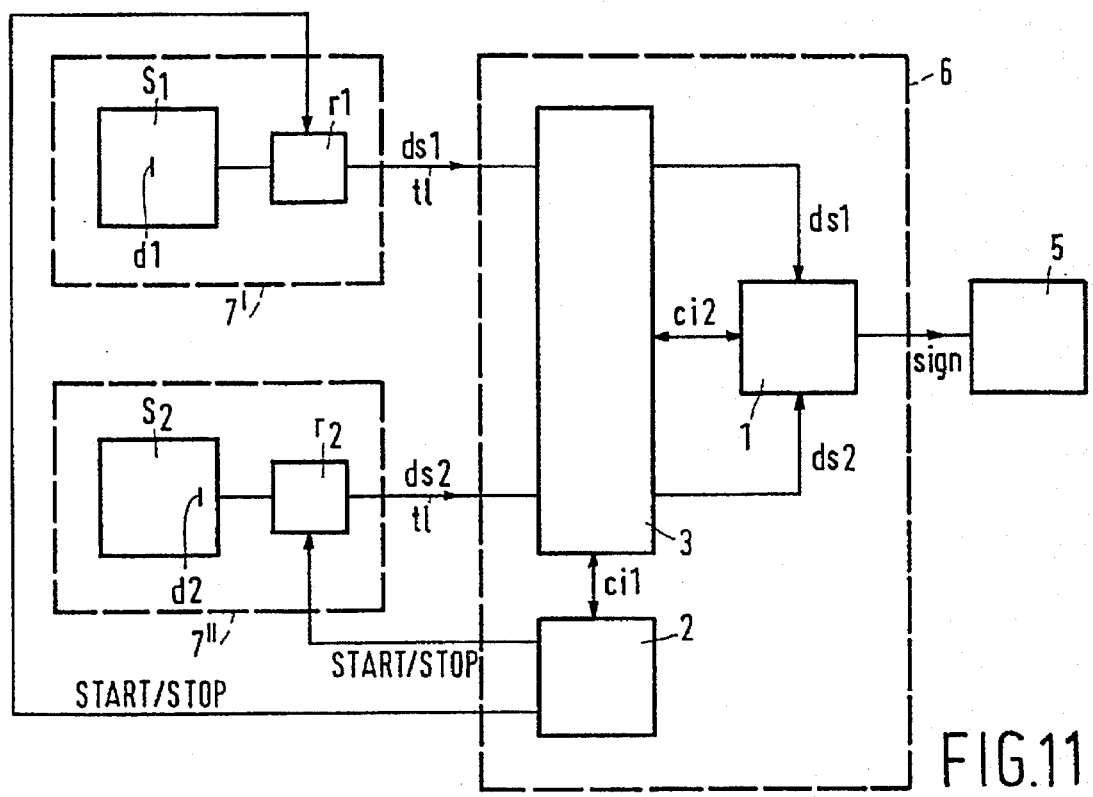
FIGS. 11 and 12 show further embodiments of a system according to the invention.

FIG. 11 shows a further embodiment for a system according to the invention. In this embodiment both the first storage medium, on which the basic part is stored, and the second storage medium, on which the complementary part is stored, are coupled to the merging means via the communications network. The storage media are found in different databanks 7', 7". These databanks may be controlled by the same provider who provides the basic part at a low rate and the complementary part at a higher rate.

Figure 12:
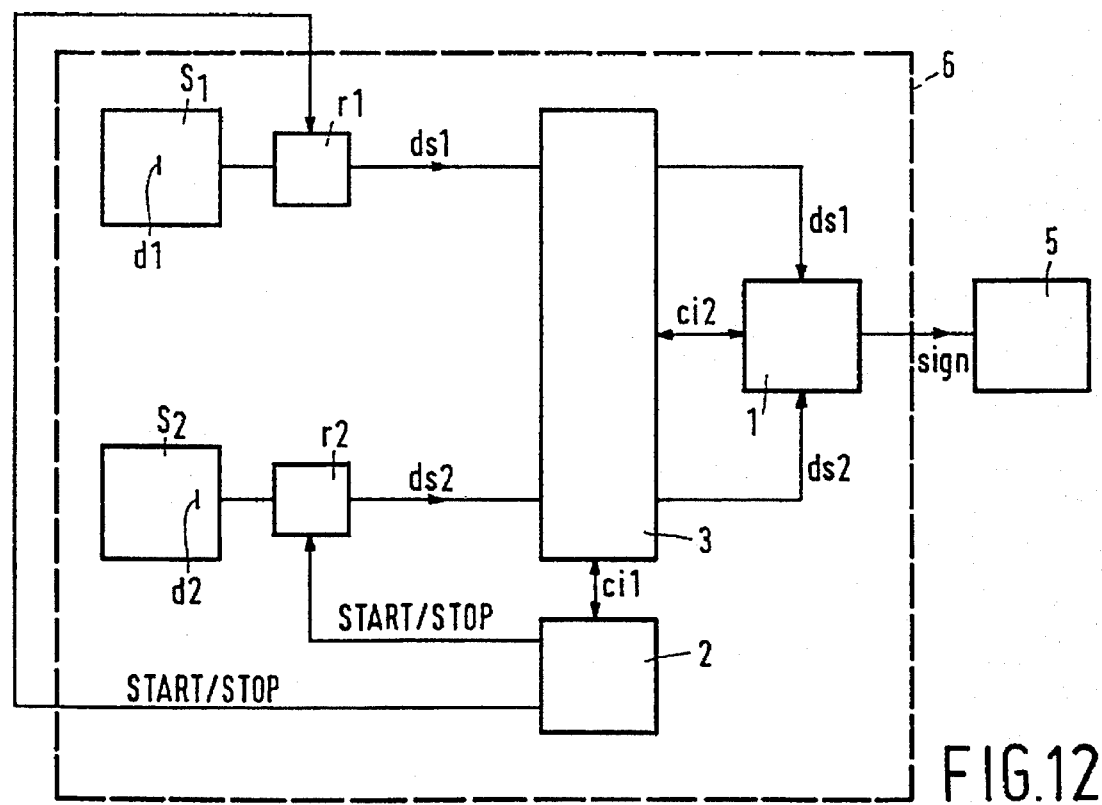

FIG. 12 shows yet a further embodiment for a system according to the invention. In this system both the first storage medium, on which the basic part is stored, and the second storage medium, on which the complementary part is stored, are included in the merging means. The two storage media which are CD-i discs in the case where the system according to the invention is a CD-i system, may be presented to the user by the same provider, a higher rate being asked for the CD-i disc storing the complementary part than for the CD-i disc storing the basic part. Alternatively, it is possible for the two storage media to form one physical unit, but to be functionally separated.

We claim:

1. System for providing an audio-visual presentation comprising a basic part and at least a complementary part, the system comprising functionally distinguishable storage media for storing the basic part and the complementary part, and merging means for merging the basic part with the complementary part into the audio-visual presentation, characterized in that the complementary part is intended for enhancing the quality of the audio-visual presentation that can be achieved with the basic part and wherein the storage medium containing the basic part is located near the merging means and wherein the storage medium containing the complementary part is coupled to the merging means via a transmission line of a communications network.

2. System as claimed in claim 1, characterized in that the merging means are arranged for real-time merging the basic part with the complementary part.

3. System as claimed in claim 1, characterized in that the audio-visual presentation is divided into a basic part and a complementary part by an MPEG encoder and in that the merging means comprise an MPEG decoder for merging the basic part with the complementary part into the audio-visual presentation.

4. System as claimed in claim 1, characterized in that the system further comprises control means for causing reading means to read the basic part and the complementary part in response to pre-fed information about locations on the storage media where the basic part and the complementary part are found.

5. System as claimed in claim 4, characterized in that the storage media are subdivided into sectors containing data that belong to the basic part and the complementary part, and in that the location information contains numbers of the sectors.

6. System as claimed in claim 4, characterized in that the system comprises synchronizing means for mutually synchronizing data streams to be fed to the merging means, which data streams contain data belonging to the basic part and the complementary part.

7. System as claimed in claim 6, characterized in that the synchronizing means comprise buffers according to the First-In First-Out principle for receiving the data streams and in that the synchronizing means are arranged for monitoring the packing factor of the buffers and issuing, in response thereto, control information to the control means, which control means are arranged for providing flow control of the data streams by means of the control information.

8. Storage medium to be used in a system as claimed in claim 1, characterized in that the storage medium stores the basic part of the audio-visual presentation.

9. Storage medium to be used in a system as claimed in one of claim 1 to characterized in that the storage medium stores the complementary part of the audio-visual presentation.

10. Device comprising a storage medium for storing a basic part of an audio-visual representation and merging means for merging the basic part with a complementary part of the audio-visual presentation to be transmitted to the device via a communications network into a signal that represents the audio-visual presentation, characterized in that the complementary part is intended for enhancing an audio-visual presentation quality that can be achieved with the basic part.

* * * * *